Figure 1:
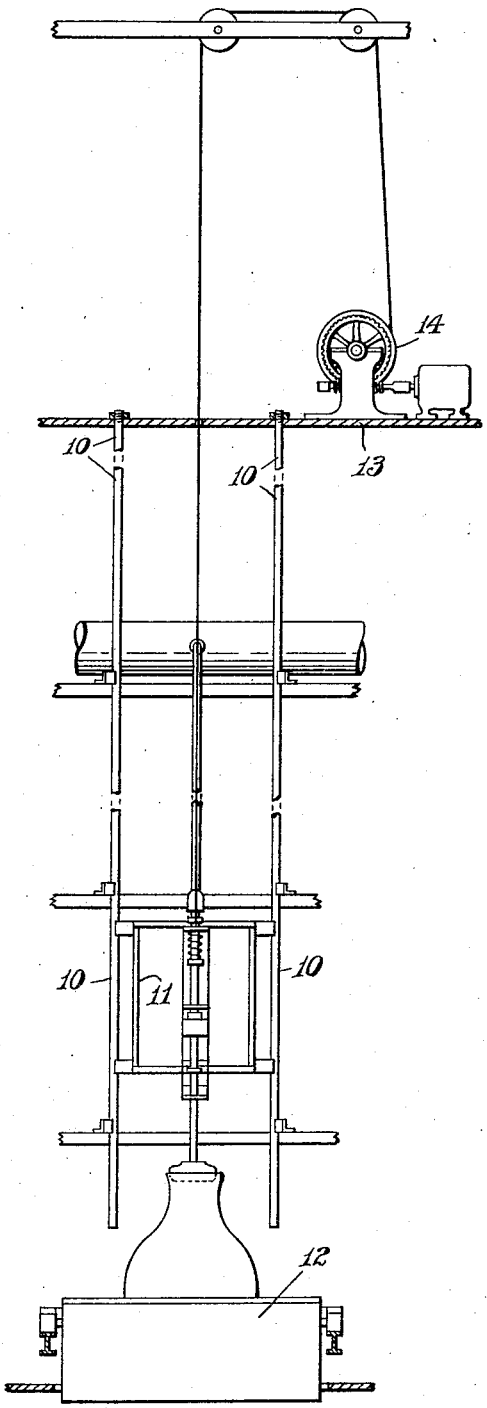

May 31, 1927. 1,631,097
R. D. HURLEY ET AL
GLASS DRAWING APPARATUS
Filed June 24, 1925

INVENTORS
Brooke H. Patton and
Raymond D. Hurley,
BY
Hood & Hahn.
ATTORNEYS

Patented May 31, 1927.

1,631,097

UNITED STATES PATENT OFFICE.

RAYMOND D. HURLEY AND BROOKE H. PATTON, OF CLARKSBURG, WEST VIRGINIA, ASSIGNORS TO ROLLAND GLASS COMPANY, OF CLARKSBURG, WEST VIRGINIA, A CORPORATION OF WEST VIRGINIA.

GLASS-DRAWING APPARATUS.

Application filed June 24, 1925. Serial No. 39,282.

In the drawing of glass cylinders as a preliminary to the production of window glass, a bait is supported upon a vertically movable cage and first lowered into a bath of molten glass and then slowly raised, while expanding air is delivered through the bait. It is necessary in such apparatus that the bait supporting cage or carriage be guided in its vertical movements and that these guides be lubricated.

For many years the problem of lubricating these vertical guides and the vertically moving carriage has been a serious one due to the fact that the heat, arising from the glass bath, highly heats the guides and carriage and lubricants do not last long under such conditions. Furthermore pieces of metal broken or scaled off the guides due to lack of lubrication are apt to drop into the glass pot. It has been the common practice to intermittently lubricate the guides by having a workman stand upon the carriage and apply lubricant to the guides as the carriage rises and descends, but this is a disagreeable, and in some respects, a dangerous, job, because operations in a glass factory are substantially continuous and cannot be intermitted and consequently the act of lubrication must be performed under ordinary working conditions where the rise of the carriage, through a distance of thirty to forty feet, is at the rate of about one and one half feet per minute. It is apparent, therefore, that the operator lubricating the guides must be subjected to the intense heat immediately over the glass bath for a period of fifteen or twenty minutes or more. As a consequence the workmen are quite apt to neglect proper lubrication of the guides and carriage shoes wear out quite quickly whereupon operations must be suspended for replacement with a consequent loss of production.

Figure 2:
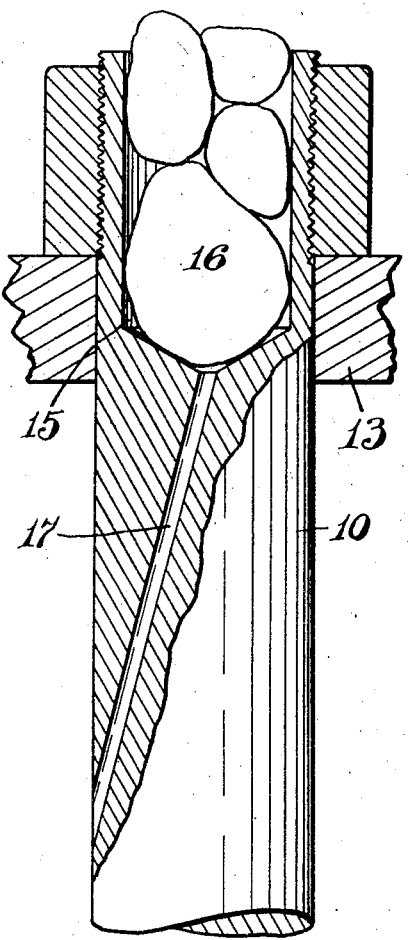

The object of our present invention is to provide means by which the guides of glass drawing apparatus of this type may be more readily and efficiently lubricated. The accompanying drawings illustrate our invention:

Fig. 1 is a fragmentary elevation largely diagrammatical in character, of a glass drawing apparatus to which our invention is applied, and Fig. 2 is a fragmentary vertical section, approximately full size of our improvement.

In the drawings 10, 10 indicate the usual vertical guides between which the bait carriage 11 is mounted, said guides extending from a point a short distance above the glass bath apparatus 12 to a floor 13 of the pent house a distance of forty feet or more above the glass bath, where the hoisting apparatus 14 is placed.

The heat rises from the glass bath and thus heats the entire lengths of the guides 10, the lower ends being considerably hotter than the upper ends.

We therefore form a lubricant receiving pocket 15 in the upper end of each guide 10 so that the lubricant 16 placed therein will be subjected to the heat acquired by the guides, said heat at this point being sufficient to very gradually melt a lubricant which has a melting point sufficiently high to permit it to retain its proper lubricating value even when subjected to the higher heat acquired by the lower ends of the guides 10. Leading from the lower end of each pocket 15, conveniently by drilling diagonally from the bottom of the pocket to the inner face of the guide, is a passage 17 through which the melted lubricant may slowly pass to the inner face of the guide, said lubricant running from that point down along the inner face of each guide and being picked up by the wearing shoes of the carriage 11 and by them distributed throughout the length of the guides.

We find it desirable to so proportion the passage 17 that the rate of flow of lubricant will be just sufficient to permit the lubricant to be distributed throughout the entire length of the guides but not in sufficient quantity to drip from the lower ends of the guides.

In practice we have found that by charging each pocket 15 with a quantity of the usual lubricant paraffin once each shift of eight hours, we are enabled to keep the guides properly lubricated to such an extent that the life of the carriage shoes is enormously increased. The lubricant may be readily placed without danger, and without in any way interrupting operations, because access to the pent house is not in any way uncomfortable or dangerous and does not require any variation in operation of the apparatus.

We claim as our invention:

1. A glass drawing apparatus comprising means for establishing a pool of molten glass, guides arranged vertically over said pool means and subject to the heat thereof, a bait supporting carriage vertically movable between said guides, and means for lubricating each of said guides comprising a lubricant pocket associated with the upper end thereof in such manner as to receive heat therefrom by conduction, said lubricant pocket having a conduit leading to the carriage-engaged surface of the guide.

2. A glass drawing apparatus comprising means for establishing a pool of molten glass, guides arranged vertically over said pool means, a bait supporting carriage vertically movable between said guides, a lubricant pocket formed in the upper end of each of said guides each of said pockets having a conduit leading therefrom to the carriage-engaged surface of the guide.

In witness whereof, we have hereunto set our hands at Clarksburg, West Virginia, this 19th day of June, A. D. one thousand nine hundred and twenty five.

RAYMOND D. HURLEY.
BROOKE H. PATTON.